March 2, 1954
C. O. BRUESTLE
2,670,829
CENTRIFUGAL CLUTCH
Filed June 27, 1950
2 Sheets-Sheet 1
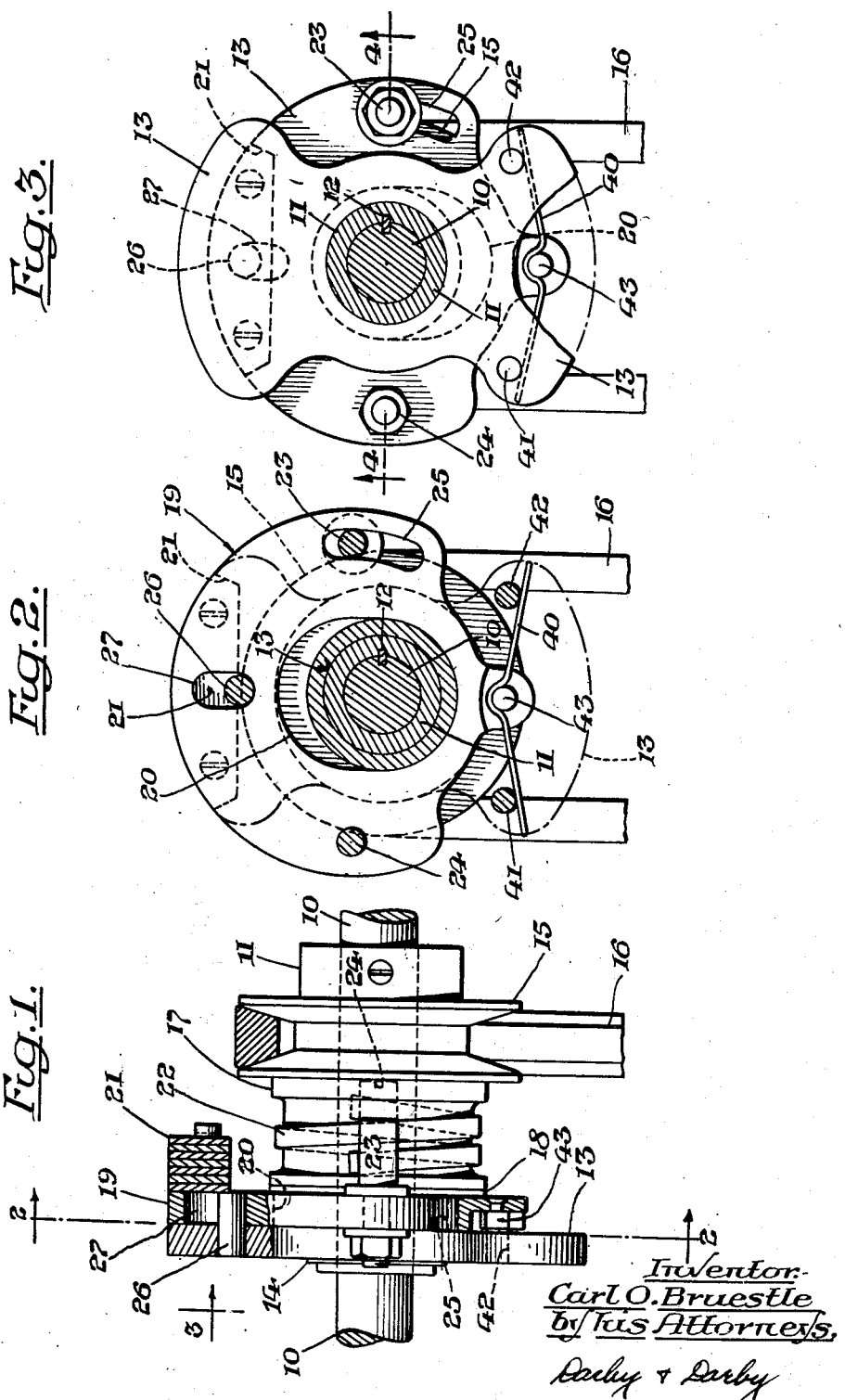
Inventor:
Carl O. Bruestle
by his Attorneys,
Darby & Darby

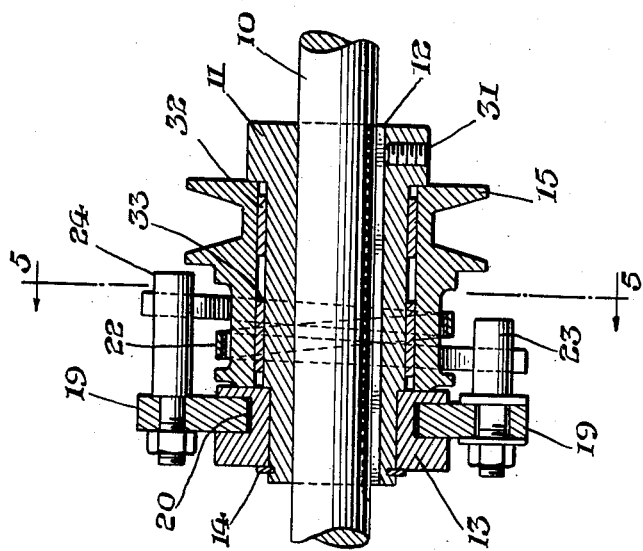
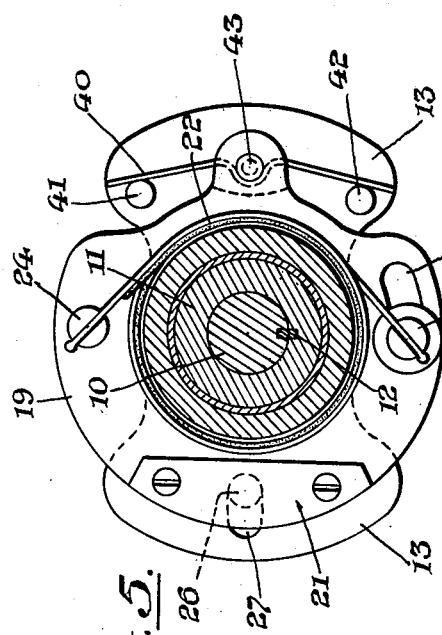
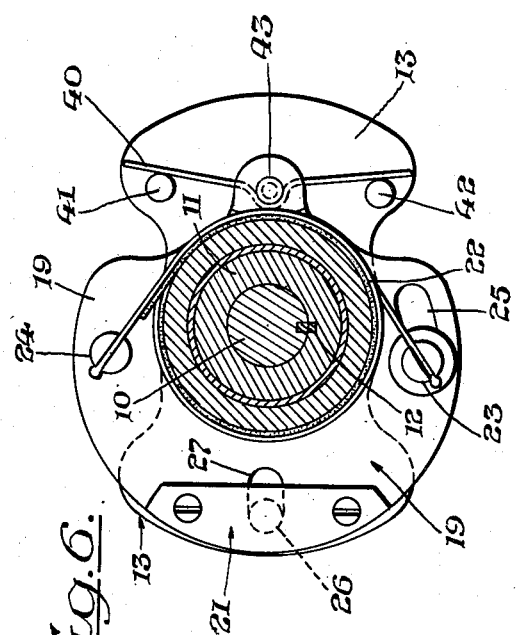
Inventor:
Carl O. Bruestle
by his Attorneys,
Darby & Darby Patented Mar. 2, 1954

2,670,829

UNITED STATES PATENT OFFICE 2,670,829

CENTRIFUGAL CLUTCH

Carl O. Bruestle, Metuchen, N. J., assignor to Centric Clutch Company, Cranford, N. J., a corporation of New Jersey Application June 27, 1950, Serial No. 170,612

3 Claims. (Cl. 192—105)

This invention relates to a coupling device for transmitting power from a driving member to a load and, more particularly, it relates to a centrifugal coupling member embodying a flexible clutching band.

For many purposes in mechanical power transmission it is highly desirable to have the driving member or prime mover operating at a given rate of speed before it transmits power to a load. Various methods of so doing are known. In some types of operation the application of the prime mover to the load is desired at a given rate, such as when the prime mover has reached full load speed. Similarly, should the prime mover fall below full speed it is desirable to have an automatic decoupling for such an occurrence. Advantage has been taken in the past of centrifugal devices for so doing.

It is accordingly a fundamental object of this invention to provide an improved centrifugal coupling device for connecting a driving member to a load to transmit power thereto.

It is a second object of the invention to provide a flexible coupling connection between a prime mover and a load.

Other objects and advantages of the invention will in part be obvious and in part appear hereinafter.

The invention, accordingly, is embodied in a structure having a means for coupling a pair of shafts acting as a flexible coupling to take up linear amounts of play, the device including a hub carrying a pulley or sprocket for transmitting power to a load, the said pulley being free-running on said hub in a no load condition, the pulley also having adjoining it, a circumferential clutching area, there being mounted on the hub a centrifugal member forming a bracket over the hub. The bracket serves to furnish anchor points for a flexible band looped around the clutching area of the driven member so that when a given speed of rotation is developed, centrifugal force will cause the bracket to be displaced from the hub, thereby taking up slack on the flexible band to apply clutching force to the pulley. Thus the invention is embodied in a centrifugal clutching member having the features of construction, combinations of elements and arrangement of parts indicated which will be described in greater detail as follows:

In the drawings—

Figure 1 constitutes a side elevation of the device showing the shaft and the relationship of the several parts thereto;

Figure 2 is a section taken along the line 2—2 of Figure 1 to show the location and construction of the bracket member serving to convert centrifugal force to a clutching force;

Figure 3 is a section taken across the shaft at line 3—3 of Figure 1 and shows an end elevation of the device;

Figure 4 is a section through the device taken along the line 4—4 of Figure 3 showing the internal construction and arrangement of parts;

Figure 5 is a section taken along the line 5—5 of Figure 4 showing the device in the free-running condition; and Figure 6 is a section taken along the lines 5—5 of Figure 4 and shows the relationship of parts during the clutching period.

Referring back now to Figures 1 and 4 for a more detailed understanding of the construction of the device and the relationship of the several parts, 10 represents a shaft on which the device is mounted. Thus 11 is the hub or drum carrying the entire device which is held in place on shaft 10 by key 12. Firmly mounted on the hub 11 is end plate 13 which is fastened to the hub by means of snap ring 14 to hold it in place. Hub 11 and end plate 14 are fixed to each other and in use will rotate together. Rotatably mounted on hub 11 is pulley 15, or a sprocket, which serves to drive belt 16 to transmit power thereto and to a load.

Adjacent to pulley 15 and, in a preferred combination of the device, forming an integral part thereof is a clutching drum 17, which is held in fixed relationship to the hub by spacer 18. The latter is fixed to hub 11 and, with plate 13, serves to define a space within which is mounted bracket 19. Radially outward from the shaft on bracket 19 there is mounted a plurality of weights 21 to give direction to centrifugal force which is developed by rotation thereof. The bracket 19 will be seen by reference to Figure 2 is mounted on hub 11 through an elliptical central hole 20 so that substantial play is available in the direction of the major axis of the said hole, which is in the direction of the weights 21. The number of weights, of course, can be varied to alter the outward centrifugal force to be developed.

For developing the clutching force, flexible band 22 is snubbed around clutch drum 17 from mounting point 23 on one side of bracket 19 to mounting point 24 on the other side thereof. It will be observed through examination of Figure 2 that an adjustment is allowed for in the amount of play in said flexible band by setting point 23 in an arcuate opening 25 in bracket 19 so that minor adjustment in the length of the flexible band can be made.

For maintaining alignment of parts and guiding bracket 19 in its movement, pin 26 is mounted in end plate 13 and slot 27 thereby to permit bracket 19 to develop the necessary amount of radial motion for the functioning of the device. The orientation of slot 27 is in the same direction as the orientation of the elliptical hole 20 in bracket 19.

It will be seen in Figure 2 that the device has been drawn to show bracket 19 at its extreme outward radial position and the snubbing action of the flexible band is in effect. That is, the outward movement of bracket 19 has tightened band 22 around drum 17 to effect rotation of pulley 15. In Figure 3 the device is shown with the opposite condition prevailing.

In Figure 4 the detailed construction appears as revealed by longitudinal section through the device. Shaft 10 is shown keyed to hub 11 by key 12, which is also held in place by set screw 31. Under the pulley 15 there are shown bearing liners 32 and 33 which serve to help in lubricating the device. The other parts of the apparatus are readily identifiable from the designations applied thereto in Figure 1, namely the anchor points 23 and 24, which are shown as bolts, and the flexible band 22.

In Figures 5 and 6 there is shown the function of spring device 40 which serves to assist in disengaging the parts when conditions change from driving to free-running. Thus in Figure 5 spring 40, bearing against pins 41, 42 and 43, by its curvature, applies a radial centralizing force on bracket 19. During the period the device is free-running, the parts are centered as shown in Figure 5. When the clutch is in operation and the prime mover is driving pulley 15 through flexible band 22, spring 40 is distorted and overcome and bracket 19 is in an off-center position. When the driving speed is reduced the lag which might be inherent in the apparatus for uncoupling the flexible band from a clutching surface is overcome by the force of spring 40, for at a given speed level centrifugal force is reduced to a point which might be sufficiently high to keep the clutch still engaged, but the force of the spring is sufficient to disengage the flexible band by centering bracket 19.

From the detailed explanation of the construction of the device as has been set forth above the mechanism and operation should be fairly apparent. However, by reference to Figure 1 it will be seen that in the free-running condition driving shaft 10 will cause it to rotate with the hub 11 and end plate 13. However, in view of the fact that pulley 16 and clutch 17 are made free-running on the hub 11, they will not be engaged and the load, which is to be driven by pulley 16, will hold them stationary. When the speed of rotation of the hub 11 reaches its desired level centrifugal force developed by weights 21 on bracket 19 will be sufficient to cause bracket 19 to move radially outward, thereby to take up slack on the band 22 and apply a snubbing action to the clutching drum 17, with the result that the load will be engaged and driven at the desired rate of speed. When the rate of speed is reduced to a given level the load is disengaged by a reverse sequence of steps.

Though the invention has been described with only a single embodiment, that has been for the purpose of illustrating the principle thereof and it is to be understood that those skilled in the art could develop variations of the instant invention without departing from the spirit or the scope thereof.

What is claimed is:

1. In a device for coupling a rotary driving member to a driven member, a drive shaft, a drum mounted on said shaft and fixed thereto, a free-running driven member on said shaft, and anchor means mounted on said drum, comprising a bracket adjacent to said drum, said drum having thereon a guiding pin which permits a limited amount of radial movement of said bracket with respect to the center of the said drum, said bracket carrying on substantially diametrically opposite points with respect to the drum a pair of anchor pins, and a flexible band connected at its respective ends to said anchor pins and passing from one of said anchor pins around said driven member to the second of said anchor pins, so that radial movement of said bracket causes said flexible band to seize said driven member.

2. A coupling device for coupling a rotary driving member to a driven member comprising a drum for mounting on a driven shaft, a free-running pulley and clutching cylinder on said drum, said pulley and said cylinder being joined, and a bracket mounted on said drum for radial movement with respect thereto, and an end plate fixed to said drum, said end plate engaging said bracket, and a clutching means comprising a flexible band mounted at one point on said bracket and passing at least once around said clutching cylinder and thereafter fastened to a second point on said bracket so that radial movement of the bracket produces a snubbing action on the driving member to transmit power from the drum to the pulley.

3. A coupling device for coupling a rotary driving member to a driven shaft, comprising a drum for mounting on the drive shaft, a free-running pulley and clutching cylinder integral therewith on said drum, a bracket mounted on said drum for radial movement with respect thereto and an eccentric weight on said bracket to direct radial movement thereof, an end plate fixed to said drum, said end plate engaging said bracket, and a clutching means comprising a flexible band mounted at one point on said bracket and passing at least once around said clutching cylinder, and thereafter fastened to a second point of said bracket, said points of attachment being substantially opposite to the axis of the path of movement of the bracket, so that radial movement of the bracket produces a snubbing action on the clutching cylinder to transmit power to the pulley.

CARL O. BRUESTLE.

References Cited in the file of this patent

UNITED STATES PATENTS

| Number | Name | Date |
| --- | --- | --- |
| 272,330 | Rouse | Feb. 13, 1883 |
| 715,443 | Vanhouweling | Dec. 9, 1902 |
| 779,355 | Killinger | Jan. 10, 1905 |
| 1,486,518 | Hartley | Mar. 11, 1924 |

FOREIGN PATENTS

| Number | Country | Date |
| --- | --- | --- |
| 28,961 | France | May 11, 1925 |